(12) United States Patent
Landers, Jr. et al.

(10) Patent No.: US 10,140,605 B2
(45) Date of Patent: Nov. 27, 2018

(54) MONITORING THE DOCKING STATES OF PORTABLE PAYMENT TERMINALS IN MOBILE POINT-OF-SALE (MPOS) SYSTEMS

(71) Applicant: Toshiba Global Commerce Solutions Holdings Corporation, Tokyo (JP)

(72) Inventors: John David Landers, Jr., Raleigh, NC (US); Paul Wilson, Cary, NC (US); David John Steiner, Raleigh, NC (US); Kimberly Wood, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 607 days.

(21) Appl. No.: 14/660,180

(22) Filed: Mar. 17, 2015

(65) Prior Publication Data
US 2016/0275479 A1 Sep. 22, 2016

(51) Int. Cl.
| | | |
|---|---|---|
| *G06F 3/00* | (2006.01) | |
| *G06Q 20/32* | (2012.01) | |
| *G06Q 20/20* | (2012.01) | |
| *G06Q 20/18* | (2012.01) | |
| *G06F 1/16* | (2006.01) | |
| *G06F 13/40* | (2006.01) | |
| *G06F 13/38* | (2006.01) | |

(Continued)

(52) U.S. Cl.
CPC ....... *G06Q 20/3227* (2013.01); *G06F 1/1632* (2013.01); *G06F 11/3093* (2013.01); *G06F 11/327* (2013.01); *G06F 13/385* (2013.01); *G06F 13/4081* (2013.01); *G06Q 20/18* (2013.01); *G06Q 20/202* (2013.01)

(58) Field of Classification Search
CPC .. G06F 11/3093; G06F 11/327; G06F 13/385; G06F 13/4081; G06F 1/1632; G06Q 20/18; G06Q 20/202; G06Q 20/3227
See application file for complete search history.

(56) References Cited

U.S. PATENT DOCUMENTS

| | | |
|---|---|---|
| 6,144,848 A | 11/2000 | Walsh et al. |
| 7,356,359 B2 | 4/2008 | Oh |

(Continued)

FOREIGN PATENT DOCUMENTS

| | | |
|---|---|---|
| WO | 2013106723 A2 | 7/2013 |
| WO | 2013132515 A2 | 9/2013 |

*Primary Examiner* — Idriss N Alrobaye
*Assistant Examiner* — Richard B Franklin
(74) *Attorney, Agent, or Firm* — Coats & Bennett, PLLC

(57) ABSTRACT

A portable payment terminal (PPT) that is used to facilitate customer transactions in a mobile point-of-sale (MPOS) system is assigned to a particular tablet device. The PPT device may dock with to charge its batteries, and undock from the tablet device to facilitate customer transactions. To maintain a requisite one-to-one relationship between the two devices, a timer is started whenever the PPT device is undocked from the tablet device. Additionally, checks are performed to ensure that the PPT device is authorized to dock with the tablet device. If the PPT device remains undocked from the tablet device for a predetermined time period, or if the PPT device is not authorized to dock with the tablet device, the functions of the tablet device and/or the PPT device are disabled to reduce or eliminate the usability of the devices to a user.

20 Claims, 6 Drawing Sheets

(51) Int. Cl.
   *G06F 11/32*   (2006.01)
   *G06F 11/30*   (2006.01)

(56) References Cited

U.S. PATENT DOCUMENTS

| | | |
|---|---|---|
| 2004/0088452 A1* | 5/2004 | Scott ..................... G06F 1/1632 |
| | | 710/62 |
| 2004/0111320 A1 | 6/2004 | Schlieffers et al. |
| 2004/0159700 A1 | 8/2004 | Khan et al. |
| 2010/0088439 A1 | 4/2010 | Ang et al. |
| 2013/0085875 A1 | 4/2013 | Lamba |
| 2013/0124346 A1 | 5/2013 | Baldwin et al. |
| 2013/0179351 A1 | 7/2013 | Wallner |
| 2013/0254117 A1 | 9/2013 | von Mueller et al. |
| 2014/0001263 A1 | 1/2014 | Babu et al. |
| 2014/0058859 A1 | 2/2014 | Alexander |
| 2014/0085089 A1 | 3/2014 | Rasband et al. |
| 2014/0191034 A1 | 7/2014 | Glanzer et al. |
| 2014/0195429 A1 | 7/2014 | Paulsen |
| 2015/0286252 A1* | 10/2015 | Barone ............... G06F 13/4081 |
| | | 710/304 |

* cited by examiner

MONITORING THE DOCKING STATES OF PORTABLE PAYMENT TERMINALS IN MOBILE POINT-OF-SALE (MPOS) SYSTEMS

TECHNICAL FIELD

The present disclosure relates generally to Mobile Point-of-Sale (MPOS) systems, and more particularly, to a method and apparatus for enforcing a docking state between a Portable Payment Terminal (PPT) device and a tablet device.

BACKGROUND

Retailers in a Mobile Point-of-Sale (MPOS) space generally employ Portable Payment Terminal (PPT) devices that dock with corresponding tablet devices. In operation, employees who have such devices roam through the aisles of the retailer's store. Customers wishing to purchase a product or service offered by the retailer can then simply approach an employee and pay for the desired product or service via the PPT. Such systems are becoming increasingly desirable for retailers as they reduce or eliminate the need for customers to stand in long lines at a fixed checkout lane or pay station. However, even in this mobile paradigm, accepting payment from a customer is still one of the retailer's most concerning challenges.

More specifically, the PPTs used by employees have conventionally been hardwired to a corresponding table device. Such hardwiring facilitates the ability of a merchant or retailer, for example, to manage the physical location of the devices. However, MPOS systems are increasingly becoming a wireless endeavor. That is, the PPT devices need not be hardwired to a corresponding tablet device. Instead, both devices are configured to establish and maintain a short-range wireless communications link. Within this wireless paradigm, however, retailers are required by various rules to maintain a one-to-one relationship between a given PPT device and a corresponding tablet device. Moreover, these same rules require that an employee assigned to a given PPT device/tablet device combination maintain possession and control over the devices. Although wireless links between the devices is beneficial, maintaining the appropriate one-to-one relationship between a PPT device and its corresponding tablet device in the wireless context is increasingly more difficult—especially as the devices get smaller and their functions become more specialized.

DETAILED DESCRIPTION

Embodiments of the present disclosure provide a method, an apparatus, and a corresponding computer-readable storage medium for detecting whether a Portable Payment Terminal (PPT) device is docked or undocked with a corresponding tablet device, and for enforcing a one-to-one assignment between a PPT device and a particular tablet device such that only a particular PPT device is permitted to dock with a particular tablet device.

More particularly, embodiments of the present disclosure detect when a user removes or "undocks" the PPT device from the tablet device, and monitor how long the PPT device remains undocked from the tablet device. If the PPT device remains undocked from the tablet device for a time that exceeds a predetermined threshold, alert notifications are generated and sent to a user. In some cases, the present disclosure may also alter the operation of the tablet device so as to prohibit the use of the tablet device by a user. The operation of the tablet device is generally temporary, and may be performed as a single operation (e.g., simply disabling all use of the tablet device) or altered progressively in stages. In these latter cases, various selected functions of the tablet device may be disabled in a hierarchical manner so as to gradually decrease the usability of the tablet device while the PPT device remains undocked from the table device for more than the specified period of time. This would inhibit the ability of a user to employ the tablet device until the PPT device is once again docked with the tablet device.

Additionally, embodiments of the present disclosure are configured to enforce the one-to-one assignment relationship that exists between a particular PPT device and a particular tablet device. More specifically, embodiments of the present disclosure will detect when a user replaces or "docks" a PPT device in the tablet device. Upon such detection, the present disclosure obtains the identities of the PPT device and/or the tablet device, and uses that information to determine whether the PPT device is truly authorized to dock with the tablet device. If not, embodiments of the present disclosure may generate and send alert notifications, and further, alter the operation of the tablet device as described above.

Figure 1:
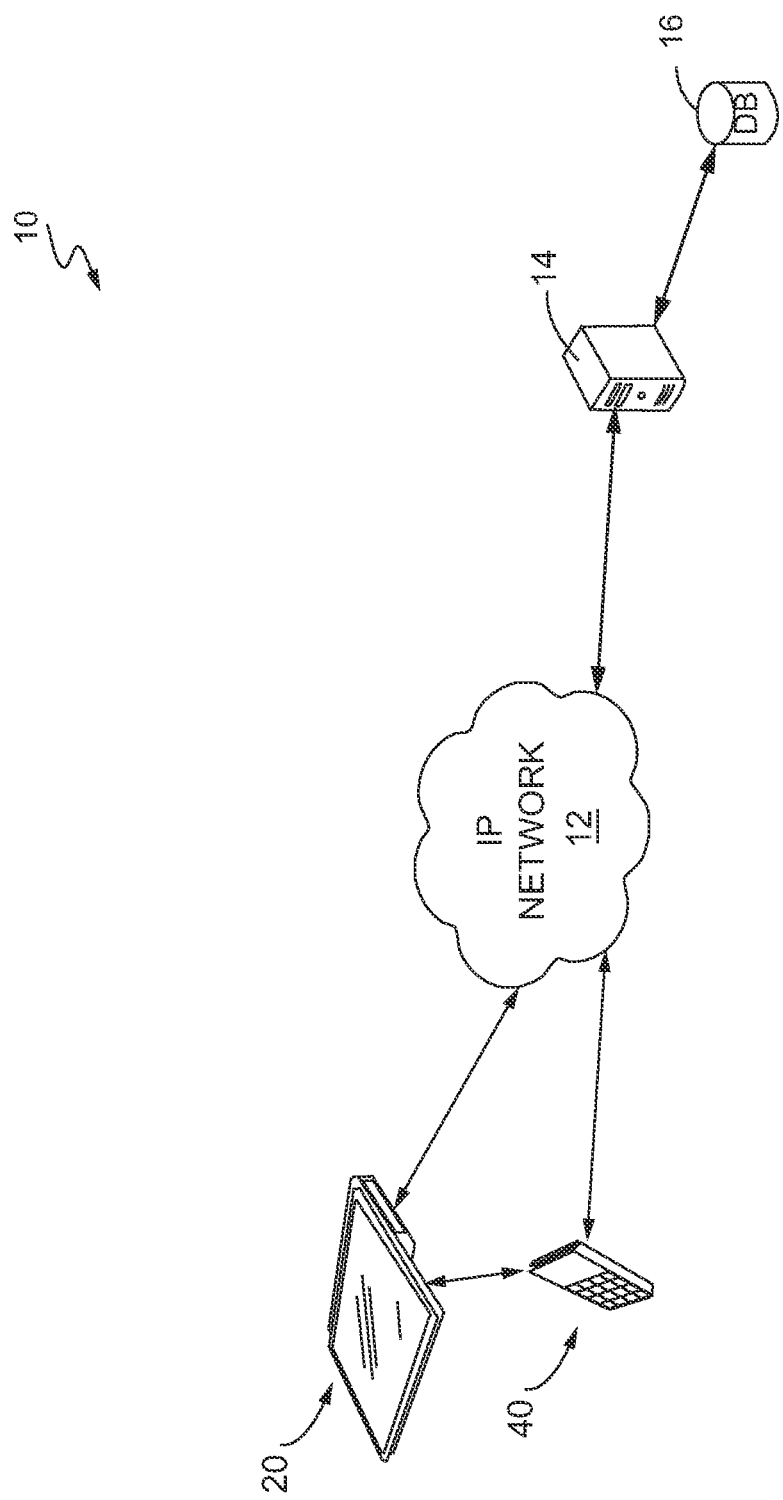
FIG. 1 is a block diagram illustrating a system 10 having with a Portable Payment Terminal (PPT) device and a Tablet Mobile Point-of-Sale (MPOS) device configured according to one embodiment of the present disclosure.

Turning now to the drawings, FIG. 1 is a block diagram illustrating a system 10 configured according to the present disclosure. System 10 may be, for example, an MPOS system of a type that is typically employed by merchants in a retail establishment such as a store, and comprises an IP network 12, an application server 14 connected to a database (DB) 16, and a PPT device 40 that docks and undocks with a corresponding tablet device 20.

Although only a single PPT device 40 and tablet device 20 are shown in the figures, those of ordinary skill in art will readily appreciate that multiple PPT devices 40 and tablet devices 20 are typically present and in use in the system 10. Further, as previously stated, there is a one-to-one relationship between each of these devices. That is, because of certain rules and requirements that are well-known to the merchants, each particular PPT device 40 in system 10 may be assigned to operate with only one particular tablet device 20. In conventional MPOS systems, there is no method for adequately enforcing this relationship, other than a reliance on the ability or willingness of an employee to visually confirm that he/she has the appropriate tablet and PPT devices 20, 40. However, such confirmation does not always occur as it should. Thus, as described in more detail later, embodiments of the present disclosure assist in the enforcement of such rules.

Generally, with MPOS system 10, employees of the merchant roam about the store with a PPT device 40 and a corresponding tablet device 20 to attend to customer transactions involving products and/or services offered by the merchant. Most customer transactions will involve the use of a credit card, gift card, or other such payment medium that the employee "swipes" using the PPT device 40; however, cash transactions are also possible, albeit in conjunction with a fixed station such as a checkout register, pay station, or other such device.

The details of non-cash transactions (e.g., product or service ID, cost, type of payment, credit card particulars, etc.) are communicated by the PPT device 40 and/or the tablet device 20 in various messages to one or more server computers 14 via network 12. There, the server 14 may obtain information regarding the transaction from DB 16, or other server computers (not shown), update information within DB 16, and return an indication to the PPT device 40 and/or tablet device 20 allowing or denying the transaction. If allowed, the tablet device 20 may be configured to print a receipt for the customer, or email the receipt to the customer's email address.

Figure 2:
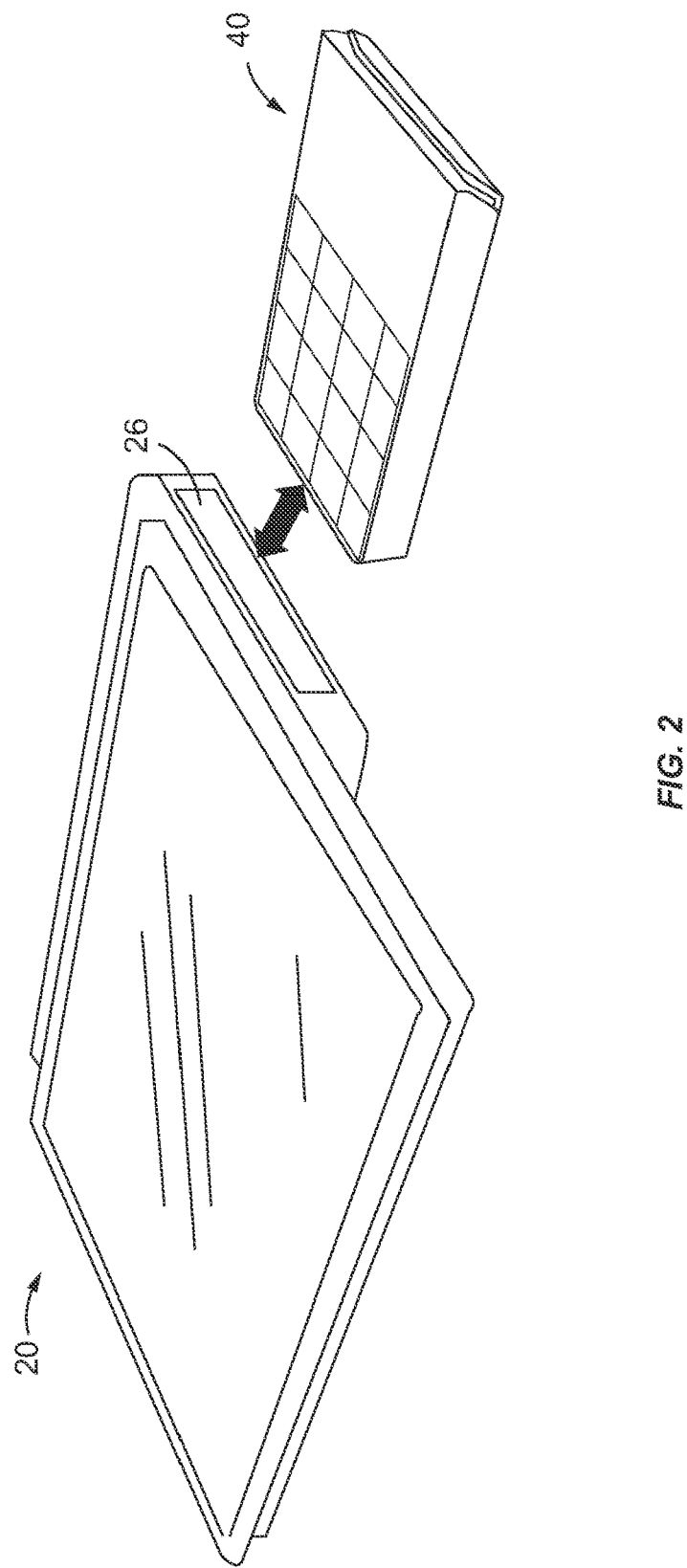
FIG. 2 is a perspective view of a PPT and a corresponding tablet device configured according to one embodiment of the present disclosure.

FIG. 2 is a perspective view of a tablet device 20 and a corresponding PPT device 40. Although the functional components of tablet device 20 are explained in more detail later, it is sufficient for now to understand that tablet device 20 comprises a docking port 26. The docking port 26 is sized and shaped such that the PPT device 40 may be inserted into the docking port 26 to "dock" with the tablet device 20, and removed from the docking port 26 to "undock" the PPT device 40 from tablet device 20. Thus, a PPT device 40 is releasably coupled to the tablet device 20 via the docking port 26. Further, according to embodiments of the present disclosure, the tablet device 20 is configured to determine whether the PPT device 40 is docked or undocked with tablet device 20.

To help determine whether the PPT device 40 is docked or undocked, both the tablet device 20 and the PPT device 40 comprise corresponding connectors and detection circuitry. When the two devices are docked, the connectors mate with one another and electrically connect the PPT device 40 to the tablet device 20. So connected, the tablet device 20 may be able to, for example, charge the batteries of the PPT device 40, as well as communicate data and commands with the PPT device 40. Such data and commands, as described in more detail later, enable the tablet device 20 determine whether the particular PPT device 40 being docked with tablet device 20 is the same PPT device 40 that is assigned to the tablet device 20. When undocked, the tablet device 20 is able to monitor how long the PPT device 40 remains undocked from the tablet device 20. If the PPT device 40 remains undocked for a specified period of time (e.g., a time expires), the tablet device 20 may autonomously alter its operation, sometimes progressively, to decrease or disable its usability to an employee.

Figure 3:
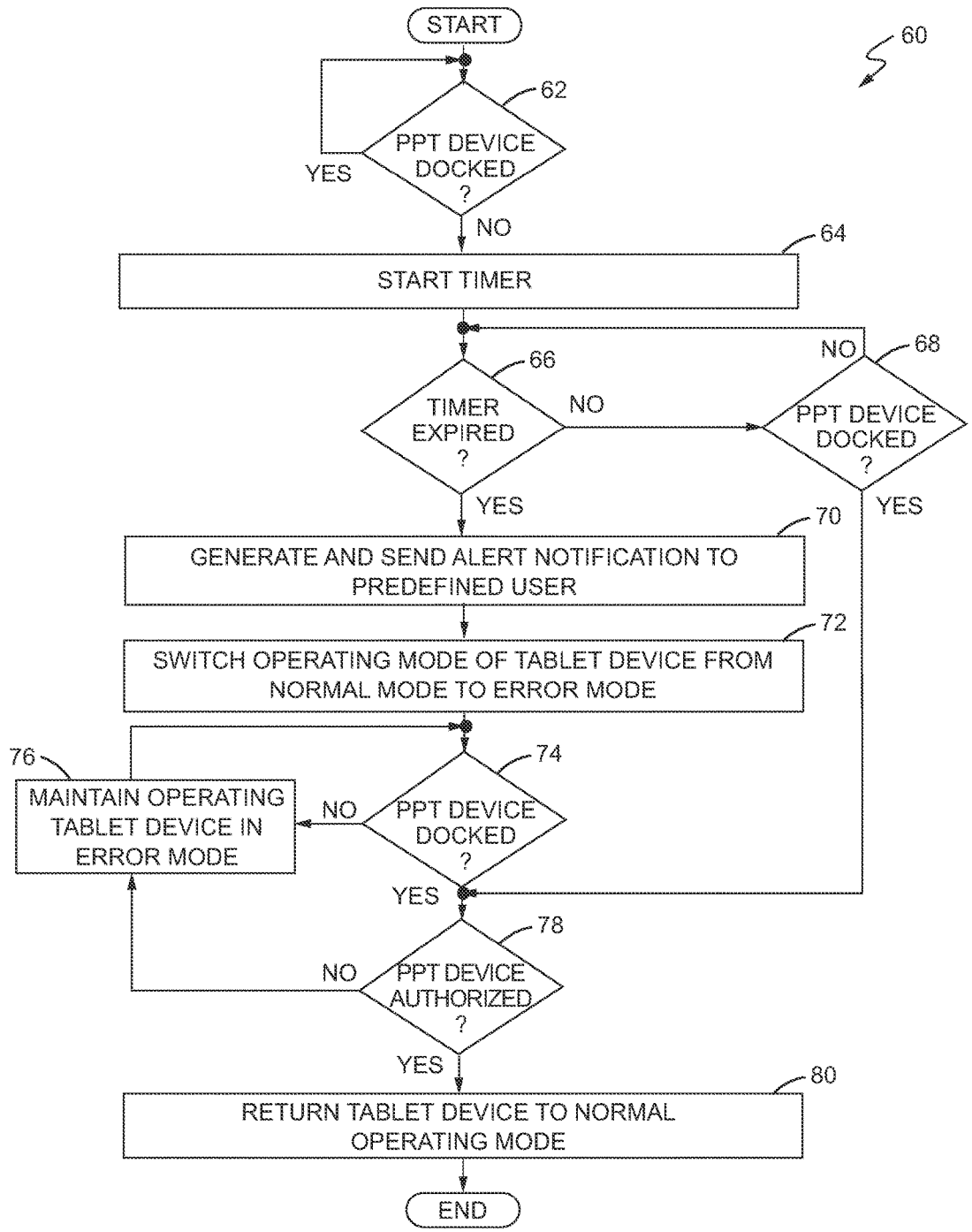
FIG. 3 is a flow diagram illustrating a method performed by a tablet device configured according to one embodiment of the present disclosure.

FIG. 3 is a flow diagram illustrating a method for monitoring a docking state of PPT device with tablet device 20 according to one embodiment of the present disclosure. As illustrated in FIG. 3, the method 60 is performed by the tablet device 20. Additionally, method 60 assumes that the unique identities or other such information representing PPT device 40 and tablet device 20 have been stored in a database (e.g., DB 16) indicating that PPT device 40 is assigned to the tablet device 20. Thus, PPT device 40 and tablet device 20 are in a one-to-one relationship.

As seen in method 60, tablet device 20 periodically checks to determine whether PPT device 40 is docked with tablet device 20 (box 62). As stated previously, this means that the PPT device 40 is fully seated within the docking port 26 of tablet device 20 such that the two devices are electrically connected to each other via corresponding connectors. In the docked state, the tablet device 20 may charge the batteries of PPT device 40. Once the tablet device 20 detects that PPT device has been removed from the docking port 26, and thus, is undocked from tablet device 20 (box 62), table device 20 will begin to monitor how long the PPT device 40 remains undocked from the tablet device 20.

To accomplish this, tablet device 20 will start an internal timer responsive to detecting that the PPT device 40 is no longer docked with the tablet device 20 (box 64). While the timer runs (box 66) tablet device 20 will periodically check to determine whether the user replaced the PPT device 40 back into the docking port 26 (box 68). If tablet device 20 detects that a PPT device 40 has been placed into the docking port 26 before the timer expires, tablet device 20 will determine whether the PPT device 40 in the docking port 40 is the same PPT device 40 that is authorized to dock with tablet device 20 (box 78).

There are various methods for determining whether the detected PPT device 40 is the authorized PPT device 40. For example, an internal memory circuit of tablet device 20 may be pre-provisioned with the identity of the authorized PPT device 40. Upon detecting the presence of PPT device 40 in the docking port 26, tablet device 20 could receive an ID or other indicator that uniquely identifies the PPT device 40. The ID may be communicated automatically by PPT device 40 in response to detecting that it has been docked, or in response to a request message sent to the PPT device 40 to provide such information. Alternatively, such as in cases where tablet device 20 is not pre-provisioned with the PPT device 40 ID, the tablet device 20 may communicate with a central server, such as server 16, for example, to determine whether the PPT device 40 detected within the docking port 26 is the assigned PPT device 40. Regardless of how the tablet device 20 performs such checks, however, if the ID of the PPT device 40 matches the ID stored in the internal memory (or that provided by server 16), tablet device 20 determines that the PPT device 40 is the authorized PPT device 40 and returns to operating normally (box 80). Otherwise, tablet device 20 places itself in an error mode, and remains in that error mode (box 76) until the proper PPT device 40 is once again docked with the tablet device 20 (boxes 74, 78).

It should be understood that there are various ways in which the tablet device 20 can be placed into an error mode. In a first aspect, tablet device 20 simply disables all functionality (except for that needed to detect and authorize PPT device 40) to prevent the user from using tablet device 20 for its intended purpose. In other aspects, however, tablet device 20 may gradually step through predefined "error" stages in which it progressively decreases its own usability. The functions that are disabled may be pre-defined, and may include, but are not limited to, dimming a display screen of tablet device 20, disabling of one or more user accessible controls in a predefined sequence, and disabling one or more application programs executing on tablet device 20, such as the control application that configures the tablet device 20 to perform the method of the present disclosure. Of course, any function of the tablet device 20 may be disabled as needed or desired.

Returning to the running timer (box 66), in cases where the timer expires before tablet device 20 detects that PPT device 40 is once again docked, tablet device 20 enters the error mode. For example, in this embodiment, tablet device 20 is configured to generate and send an alert notification to one or more predefined users (box 70). Such users may be, for example, one or more of an employee that is operating the tablet device 20, a manager, and the like. For example, tablet device 20 may generate and send an alert notification to one or more predefined devices which such users may use. The tablet device 20 will also autonomously switch its operating mode to the error operating mode (box 72). While in the error mode, tablet device 20 will periodically check to determine whether the user has replaced the appropriate authorized PPT device 40 into the docking port 26 (boxes 74, 78). If not, tablet device 20 will maintain the tablet device 20 in the error mode (box 76), as previously described. Otherwise, tablet device 20 will return to the normal operating mode (box 80) so that the user may once again utilize the functions of the tablet device 20.

Method 60 in the embodiment of FIG. 3 is described in the context of the tablet device 20. However, those of ordinary skill in the art should readily appreciate that the method of the present disclosure is not so limited. In some other embodiments, for example, method 60 is performed by the PPT device 40. In still other embodiments, method 60 is performed by both the tablet device 20 and the PPT device 40 such that the usability of one or both devices 20, 40 is decreased until the tablet device 20 and/or the PPT device 40 detect that the other of the devices 20, 40 is the device it is authorized to dock with.

Figure 4:
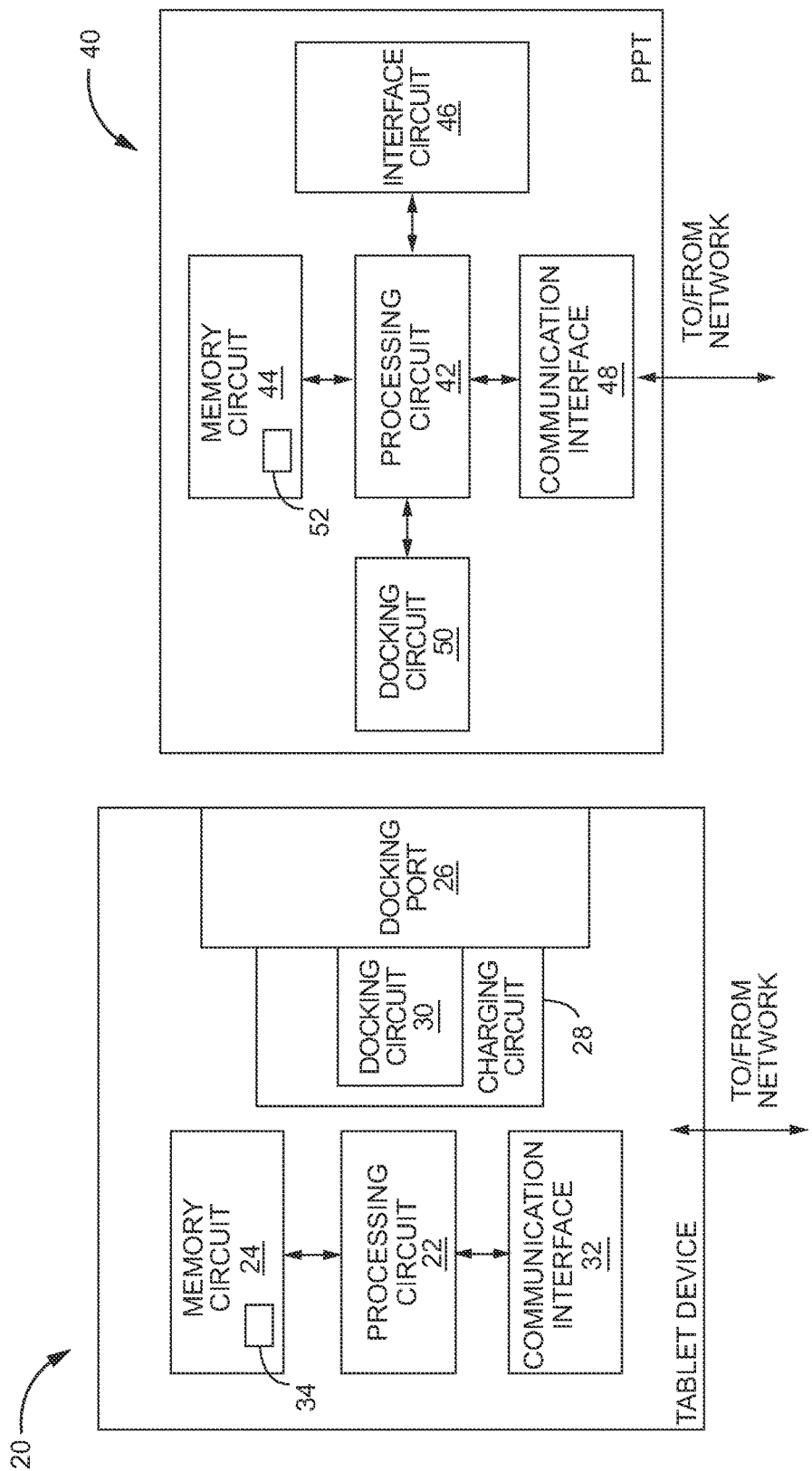
FIG. 4 is a functional block diagram illustrating some of the functional components of a table device and a PPT according to one embodiment.

To that end, FIG. 4 is a block diagram illustrating some of the functional components of a tablet device 20 and a PPT device 40. Those of ordinary skill in the art will appreciate that not all of the functional components may be illustrated in the Figures, and that some devices 20 and/or 40 may have more or fewer components as needed or desired.

As seen in FIG. 4, tablet device comprises a processing circuit 22 that is communicatively coupled to a memory circuit 24, docking port 26, a charging circuit 28, a docking detection circuit 30, and a communications interface 32 via one or more busses. Processing circuitry 22 may comprise any sequential state machine capable of executing machine instructions stored as a machine-readable computer program, such as control application 34, for example, in memory circuit 24. To that end, processing circuit 22 may be implemented as one or more hardware-implemented state machines (e.g., in discrete logic, FPGA, ASIC, etc.), programmable logic together with appropriate firmware, one or more stored-program, general-purpose processors, such as a microprocessor or Digital Signal Processor (DSP), together with appropriate software, or any combination thereof.

In operation, processing circuit 22 implements embodiments of the present disclosure, as previously described, to detect whether a PPT device 40 is docked or undocked, monitor how long the PPT device 40 remains undocked, and ensure that the PPT device 40 that is docked with the tablet device 20 is authorized to dock with the tablet device 20. Further, the processing circuit 22 is configured to switch the operating mode of the tablet device 20 between a normal operating mode and an error mode depending on whether the PPT device 40 remains undocked for too long a period of time (i.e., the timer expires), or if the PPT device 40 placed in the docking port 26 is unauthorized to dock with tablet device 20, as previously described.

Memory circuit 24 comprises any non-transitory machine-readable storage media known in the art or that may be developed. Examples of such memory circuits include, but are not limited to, magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. As seen in FIG. 4, memory circuit 24 stores a control application 34 that, when executed by the processing circuit 22, configures the processing circuit 22 to function as previously described.

The docking port 26 comprises a bay formed in the tablet device 20 that is sized and structured to receive the PPT device 40. As previously stated, table device 20 may also be configured to charge the batteries of PPT device 40, and thus, table device 20 may also comprise a charging circuit 28 and a docking circuit 30. The docking circuit 30 is configured to generate and send an indication to the processing circuit 22 responsive to detecting whether the PPT device 40 is or is not docked with tablet device 20. For example, the docking circuit 30 may receive or generate certain signals and/or data upon detecting a change in the docking state of the PPT device 40, and pass those signals and/or data to processing circuit 22. Such changes may be detected, for example, when the docking circuit 30 is electrically coupled to a corresponding docking circuit 50 in PPT device 40. Upon receipt of such indications, however, the control application 34 executed by processing circuit 22 controls the processing circuit 22 to function as previously described.

The communication interface 32 is configured to send and receive communication signals with the PPT device 40 and/or the server device 14. To that end, communications interface 32 may comprise circuitry configured to communicate in accordance with any of a variety of well-known protocols. In cases where the tablet device 20 communicates with the PPT device 40, such protocols include, but are not limited to, Near Field Communications (NFC), BLUETOOTH, RFID, WiFi, and the like. In cases where the tablet device communicates with server device 14, the protocols may include Wi-Fi, Long-Term Evolution (LTE), and other similar protocols. Therefore, according to various embodiments of the present disclosure, the communications interface 32 may comprise circuitry capable of communicating using HTTP, RTP, RTCP, HTTPs, Ethernet, TCP/IP, ATM, or the like.

The PPT device 40 also comprises a processing circuit 42, a memory circuit 44, an interface circuit 46, a communication interface 48, and a docking circuit 50. Additionally, in some embodiments, PPT device 40 may also comprise a control application 52 stored in the memory circuit 44.

The processing circuitry 42 may also comprise any sequential state machine capable of executing machine instructions stored as a machine-readable computer program, such as control application 52. As such, processing circuit 42 may be implemented as one or more hardware-implemented state machines (e.g., in discrete logic, FPGA, ASIC, etc.), programmable logic together with appropriate firmware, one or more stored-program, general-purpose processors, such as a microprocessor or Digital Signal Processor (DSP), together with appropriate software, or any combination thereof. As previously described, processing circuit 42 may be configured, in accordance with the instructions that comprise the control application 52, to perform the functions previously described. However, in at least some embodiments, the processing circuit 42 would be configured to alter the operation of the PPT device 40 (e.g., enter an error mode) responsive to the expiration of the timer and/or determining that it is not authorized to dock with tablet device 20, rather than the tablet device 20 as previously described.

Memory circuit 54 also comprises any non-transitory machine-readable storage media known in the art or that may be developed. Examples of such memory circuits include, but are not limited to, magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The communication interface 48 and docking circuit 50 are similar in function to their counterpart components in tablet device 20. Therefore, these components are not further described herein. It is sufficient to say, however, that the communication interface 48 facilitates the ability of the PPT device 40 to communicate data and information with one or both of the tablet device 20 and the server computer 16. Additionally, the docking circuit 50 comprises circuitry configured to detect whether the PPT device 40 is docked or undocked with tablet device 20, and/or to communicate with corresponding docking circuit 30 in tablet device 20 to help tablet device 20 determine the docking state of the PPT device 40. As stated above, the two docking circuits 30, 50 are electrically connected when the PPT device 40 is fully docked in the docking port 26 of tablet device 20.

The interface circuit 46 comprises the circuitry needed for receiving user input. By way of example only, such input may be a user action in response to a displayed prompt, or the details of a credit card or other financial vehicle used by a customer for payment of a desired product or service. To that end, the interface circuit 46 may comprise hardware that is well-known in the art including, but not limited to, magnetic strip readers, NFC and/or RFID readers, and the like.

Another aspect of the disclosure comprises a computer program product 90 including program code for monitoring a docking state of a PPT device 40 with tablet device 20, and for verifying that a particular PPT device 40 inserted into the docking port 26 of tablet device 20 is authorized to dock with tablet device 20. The computer program product 90 may therefore be embodied in a non-transitory, computer-readable medium, such as the memory circuit 24 of tablet device 20, the memory circuit 44 of PPT device 40, or a removable memory device, e.g. thumb drive or disc, that is coupled to either of these devices 20, 40.

Figure 5:
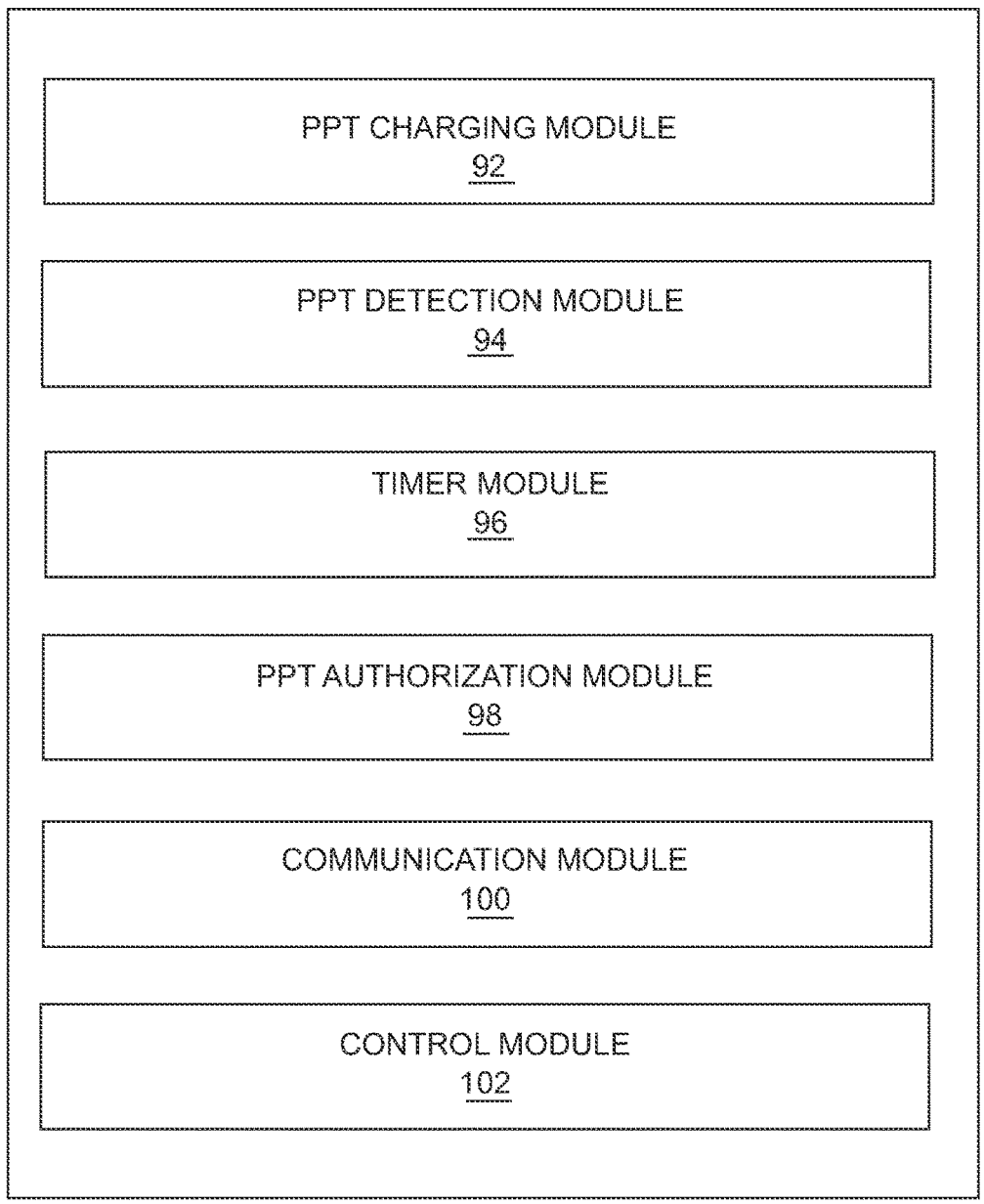
FIG. 5 is a functional block diagram illustrating exemplary functional modules of a computer program product according to one embodiment.

As seen in FIG. 5, the computer program product 90 comprises at least one of a charging module 92, a detection module 94, a timer module 96, an authorization module 98, a communication module 100, and a control module 102. Each of these modules may be executed by the processing circuit 22 of tablet device 20, or processing circuit 42 of PPT device 40, depending on the embodiment.

The charging module 92 comprises the computer program code executed to facilitate charging the batteries of the PPT device 40 when the PPT device 40 is fully docked with tablet device 20. The detection module 94 comprises the computer program code executed to detect whether the PPT device 40 is docked or undocked with tablet device 20. The timer module 96 comprises the computer program code executed to start and stop the timer, as previously described, while the authorization module 98 comprises the computer program code executed to determine whether the PPT device 40 that is docked with the tablet device 20 is actually authorized to dock with the tablet device 20. To that end, one or more of the charging module 92, the timer module 96, and the authorization module 98 may receive an indication from the detection module 94 indicating that the PPT device 40 is docked with the tablet device 20.

The communication module 100 comprises the computer program code executed to facilitate the ability of the tablet device 20 to communicate with one or both of the server device 14 and the PPT device 40. The control module 102 comprises the computer program code executed to control the functions and operation of the tablet device 20 (or the PPT device 40 depending on the embodiment) responsive to indications from the timer module and/or the authorization module 98. By way of example, the control module 102, upon receiving an indication from the detection module 94 and the timer module 96 that the timer had expired without the PPT device 40 being placed back into the docking port 26, and/or responsive to an indication from the authorization module 98 that the PPT device 40 docked with the tablet device 20 is not the appropriately assigned PPT device 40, may decrease the functionality of the tablet device 20 (or PPT device 40) in a plurality of hierarchical stages so as to progressively decrease the usability of that device. So altered, the user would not be able to employ the affected device until the appropriate PPT device 40 was once again docked with the appropriate tablet device 20. As such, embodiments of the present disclosure help to enforce rules requiring that a particular PPT device 40 maintain a one-to-one relationship with a particular tablet device 20.

Figure 6:
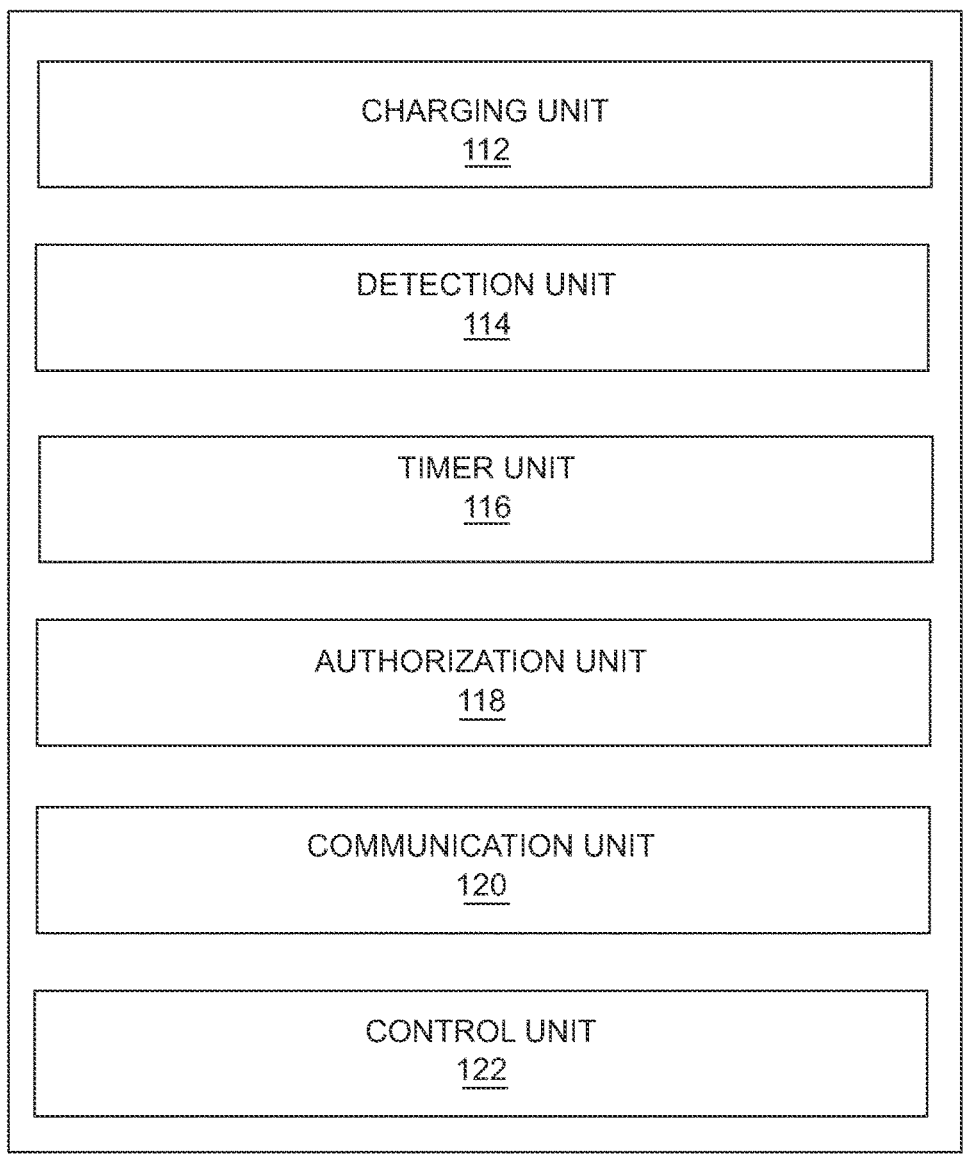
FIG. 6 is a block diagram illustrating exemplary hardware units configured according to embodiments of the present disclosure.

FIG. 6 is a block diagram illustrating hardware units 110 configured to perform the embodiments of the present disclosure. The hardware units 110 may comprise the processing circuit 22 of tablet device 20, or the processing circuit 42 of PPT device 40, depending on the embodiment. As seen in FIG. 6, the hardware units 110 comprises at least one of a charging unit 110, a detection unit 114, a timer unit 116, an authorization unit 118, a communication unit 120, and a control unit 122.

The charging unit 112 is configured to charge the batteries of the PPT device 40 when the PPT device 40 is fully docked with tablet device 20. The detection unit 114 is configured to detect whether the PPT device 40 is docked or undocked with tablet device 20. The timer unit 116 is configured to start and stop the internal timer, as previously described, while the authorization unit 118 is configured to determine whether the PPT device 40 that is docked with the tablet device 20 is actually authorized to dock with the tablet device 20. To that end, one or more of the charging unit 112, the timer unit 116, and the authorization unit 118 may receive an indication from the detection unit 114 indicating that the PPT device 40 is docked with the tablet device 20.

The communication unit 120 is configured to communicate data and information with one or both of the server device 14 and the PPT device 40. The control unit 122 is configured to control the functions and operation of the tablet device 20 (or the PPT device 40 depending on the embodiment) responsive to indications from the timer unit 116 and/or the authorization unit 118. By way of example—upon receiving an indication from the detection unit 114 and the timer unit 116 that the timer had expired without the PPT device 40 being placed back into the docking port 26, and/or responsive to an indication from the authorization unit 118 that the PPT device 40 docked with the tablet device 20 is not the appropriately assigned PPT device 40, the control unit 122 may decrease the functionality of the tablet device 20 (or PPT device 40) in a plurality of hierarchical stages so as to progressively decrease the usability of that device. So altered, the user would not be able to employ the device until the appropriate PPT device 40 was once again docked with the appropriate tablet device 20. As such, embodiments of the present disclosure help to enforce rules requiring that a particular PPT device 40 maintain a one-to-one relationship with a particular tablet device 20.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A computer-implemented method comprising:
   detecting that a Portable Payment Terminal (PPT) device is undocked from a tablet device in a Point-of-Sale (POS) system;
   monitoring a length of time that the PPT device remains undocked from the tablet device; and
   if the PPT device remains undocked from the tablet device for a predetermined length of time:
      switching an operating mode of the tablet device from a normal mode to an error mode, wherein switching to the error mode comprises disabling one or more functions of the tablet device that are enabled when the tablet device is operating in the normal mode; and
      sending an alert notification to a the user indicating that the tablet device has entered the error mode.

2. The computer-implemented method of claim 1 wherein detecting that the PPT device is undocked from the tablet device comprises detecting a signal generated by the PPT device while the PPT device is undocked from the tablet device.

3. The computer-implemented method of claim 1 wherein detecting that the PPT device is undocked from the tablet device comprises detecting an absence of a signal generated by the PPT device while the PPT device is docked with the tablet device.

4. The computer-implemented method of claim 1 wherein monitoring the length of time that the PPT device remains undocked from the tablet device comprises:
   starting a timer responsive to detecting that the PPT device is undocked from the tablet device; and
   detecting whether the timer expires before the PPT device is docked again with the tablet device.

5. The computer-implemented method of claim 4 wherein switching an operating mode of the tablet device from a normal mode to an error mode comprises switching the operating mode of the tablet device to the error mode if the timer expires before the PPT device is docked again with the tablet device.

6. The computer-implemented method of claim 1 wherein switching an operating mode of the tablet device from a normal mode to an error mode comprises switching the operating mode of the tablet device to the error mode in predefined stages, wherein the tablet device remains in each stage of the error mode for a predetermined amount of time.

7. The computer-implemented method of claim 1 further comprising:
   detecting when the PPT device is docked again with the tablet device; and
   determining whether the PPT device is authorized to dock with the tablet device.

8. The computer-implemented method of claim 7 further comprising:
   operating the tablet device in the normal mode if the PPT device is authorized to dock with the tablet device;
   operating the tablet device in the error mode if the PPT device is not authorized to dock with the tablet device.

9. The computer-implemented method of claim 7 wherein determining whether the PPT device is authorized to dock with the tablet device comprises:
   determining a PPT device identifier responsive to detecting that the PPT device is docked again with the tablet device;
   retrieving information from a network server indicating whether the PPT device is assigned to the tablet device based on the PPT device identifier; and
   determining that the PPT device is authorized to dock with the tablet device if the PPT device is assigned to the tablet device.

10. The computer-implemented method of claim 9 wherein determining a PPT device identifier responsive to detecting that the PPT device is docked again with the tablet device comprises receiving the identifier from the PPT device responsive to the PPT device docking with the tablet device.

11. A tablet device for a Point-of-Sale (POS) system, the tablet device comprising:
    a dock configured to receive a Portable Payment Terminal (PPT) device when the PPT device is docked with the tablet device;
    a docking circuit configured to detect whether the PPT device is docked or undocked from the tablet device; and
    a processing circuit communicatively connected to the docking circuit and configured to:
       monitor a length of time that the PPT device is undocked from the tablet device responsive to detecting that the PPT device is undocked from the tablet device; and
       if the PPT device remains undocked from the tablet device for a predetermined length of time:
          switch an operating mode of the tablet device from a normal mode to an error mode, wherein to switch to the error mode the processing circuit is configured to disable one or more functions of the tablet device that are enabled when the tablet device is operating in the normal mode; and
          send an alert notification to a user indicating that the tablet device has entered the error mode.

12. The tablet device of claim 11 wherein to detect that the PPT device is undocked from the tablet device, the docking circuit is configured to detect a signal generated by the PPT device while the PPT device is undocked from the tablet device.

13. The tablet device of claim 11 wherein to detect that the PPT device is undocked from the tablet device, the docking circuit is configured to detect an absence of a signal generated by the PPT device while the PPT device is docked with the tablet device.

14. The tablet device of claim 11 wherein to monitor the length of time that the PPT device remains undocked from the tablet device, the processing circuit is further configured to:
    start a timer responsive to receiving an indication from the docking circuit that the PPT device is undocked from the tablet device; and
    determine whether the timer expires before the PPT device is docked again with the tablet device.

15. The tablet device of claim 14 wherein the processing circuit is further configured to switch to operating in the error mode if the timer expires before the PPT device is docked again with the tablet device.

16. The tablet device of claim 11 wherein to switch the operating mode of the tablet device from the normal mode to the error mode, the processing circuit is further configured to:
　　switch the operating mode of the tablet device to the error mode in predefined stages; and
　　at each predefined stage, maintain operating the tablet device in the error mode for a predetermined amount of time.

17. The tablet device of claim 11 wherein the processing circuit is further configured to:
　　detect when the PPT device is docked again with the tablet device responsive to receiving a signal from the docking circuit; and
　　determine whether the PPT device is authorized to dock with the tablet device.

18. The tablet device of claim 17 wherein the processing circuit is further configured to:
　　operate the tablet device in the normal mode if the PPT device is authorized to dock with the tablet device;
　　operate the tablet device in the error mode if the PPT device is not authorized to dock with the tablet device.

19. The tablet device of claim 17 wherein to determine whether the PPT device is authorized to dock with the tablet device, the processing circuit is further configured to:
　　determine a PPT device identifier responsive to receiving an indication from the docking circuit that the PPT device is docked again with the tablet device;
　　retrieve information from a network server indicating whether the PPT device is assigned to the tablet device based on the PPT device identifier; and
　　determine that the PPT device is authorized to dock with the tablet device if the PPT device is assigned to the tablet device.

20. A non-transitory computer-readable storage medium comprising computer program code stored thereon that, when executed by a processing circuit of a tablet device for a Point-of-Sale (POS) system, configures the tablet device to:
　　detect that a Portable Payment Terminal (PPT) device is undocked from the tablet device;
　　monitor a length of time that the PPT device remains undocked from the tablet device; and
　　if the PPT device remains undocked from the tablet device for a predetermined length of time:
　　　　switch an operating mode of the tablet device from a normal mode to an error mode, wherein to switch to the error mode the computer program code executed by the processing circuit configures the tablet device to disable one or more functions of the tablet device that are enabled when the tablet device is operating in the normal mode; and
　　　　send an alert notification to a user indicating that the tablet device has entered the error mode.

\* \* \* \* \*